United States Patent [19]

Grabosky et al.

[11] Patent Number: 5,849,069
[45] Date of Patent: Dec. 15, 1998

[54] URBAN TREE SOIL TO SAFELY INCREASE ROOTING VOLUMES

[75] Inventors: Jason Grabosky, McGraw; Nina Basset, Ithaca, both of N.Y.

[73] Assignee: Cornell Research Foundation, Inc., Ithaca, N.Y.

[21] Appl. No.: 636,865

[22] Filed: Apr. 23, 1996

[51] Int. Cl.$^6$ .............................. C08L 5/00; C09D 4/00; C09D 101/00; C09D 201/00; C09J 4/00; C09J 101/00; C09J 201/00

[52] U.S. Cl. .................... 106/217.9; 106/900; 523/132; 71/27; 71/62; 71/63; 71/64.09; 71/64.12; 71/64.13

[58] Field of Search .................................... 523/130, 131, 523/132; 524/442, 443, 492, 493; 71/27, 62, 63, 64.09, 64.12, 64.13; 507/120, 225; 106/900, 217.9

[56] References Cited

U.S. PATENT DOCUMENTS

| | | | |
|---|---|---|---|
| 4,192,727 | 3/1980 | Ward | 204/159.12 |
| 5,013,349 | 5/1991 | Tanaka | 71/27 |

OTHER PUBLICATIONS

Perry, T.O., 1982, The Ecology of Tree Roots and the Practical Significance Thereof, J. Arboric, 8(8): 197.
Spomer, L.A., 1983, Physical Amendment of Landscape Soils, J. Environ. Hort. 1(3): 77–78 and 80.
Taylor, H.M., 1971, Root Behavior as Effects by Soil Structure and Strength, The Plant Root and its Environment, Carson ed., Univ. Press of Virginia, Charlottesville.
Grabosky, J. et al, 1995, A New Urban Tree Soil To Safely Increase Rooting Volumes Unders Sidewalks, Jnl of Arboric. 21(4) 187–201.
American Association of State Highway and Transportation Officials. "AASHTO Guide for Design of Pavement Structures", 1986, ASSHTO, Washington, pp. I–4–I–7 and I–14–I–16.
American Association of State Highway and Transportation Officials. "Interim Specifications for Transportation Materials and Methods of Sampling and Testing, Part 11 Interim Test Methods, test T 193–90", 1991, AASHTO, Washington, p. 68.
American Society of Testing and Materials, "Section 4 Construction", Annual Book of ASTM Standards. ASTM et., 1993, Amer. Society for Testing and Materials, Philadelphia, p. 325.
Berg, R et al, 1983, Revised Procedure for Pavement Design under Seasonal Frost Conditions, Special Report 83–27, US Army Corps of Engineers Cold Regions Research & Engineering Laboratory ed., Hanover, pp. 9–23, 32–33, 51–55, 61–63.
Chou, Y.T., 1977, Engineering Behavior of Pavement Materials: State of the Art, Technical Report S–77–9, US Army Engineer Waterways Experiment Station ed., United States Government Printing Office, Washington, pp. 4.34–4.40, 6.12–6.15 and 6.36–6.37.
Craul, P.J., 1992, Urban Soil in Landscape Design, John Wiley & Sons, Inc. New York, pp. 91,122 and 137.
Das, B.M., 1985, Principles of Geotechnical Engineering, PWS Eng oston, p. 2.
Eavis, B.W. et al, 1968, Soil Physical Conditions and Root Growth, In Root Growth, Whittington ed., I Butterworths, Londons, pp. 315–316.
Gerke, R.J., 1987, Subsurface drainage of road structures, Special Report No. 35. P.O. Morris ed., Australian Road Research Board, Victoria, p. 25.
Gordon, B.B. et al, 1965, Effect Of Rock Content On Compaction Characteristics of Clayey Gravel, Compaction of Soils STP 377, American Society of Testing And Materials, Philadelphia, p. 31.
Patterson, J.C. et al, 1980, The Impact of Urban Soils on Vegetation, Proceedings of the third conference of the Metropolitan Tree Improvement Alliance (METRIA), Abstract.
Perry, T.O., 1980, The Size, Design and Management of Planting Sites Required for Healthy Tree Growth, Proceedings of the Third conference of the Metropolitan Tree Improvement Alliance (METRIA), pp. 1,5.
Taylor, H.M., 1971, Root Behavior as Effects by Soil Structure and Strength, The Plant Root and its Environment, Carson ed., Univ. Press of Virginia. Charlottesville, 17 pages.

*Primary Examiner*—Vasu Jagannathan
*Assistant Examiner*—U. K. Rajguru
*Attorney, Agent, or Firm*—Brown, Pinnisi & Michaels, P.C.

[57] ABSTRACT

The invention teaches a stone/soil urban tree mix that can safely support pavements yet also provide ample rooting area—a current limitation—for street trees that are planted close to the pavement. By expanding the rooting zone, the mix allows increased tree growth, decreased tree mortality, and decreased sidewalk failure. The mix employs a stone aggregate that is coated with an acrylamide hydrogel slurry, creating matrix pores that suspend the soil that is added to the mix in specific amounts. The criterion for determining the critical stone to soil dry-weight mixing ratios for various stone and soil types are disclosed.

7 Claims, 3 Drawing Sheets

URBAN TREE SOIL TO SAFELY INCREASE ROOTING VOLUMES

FIELD OF THE INVENTION

The invention relates to a stone-soil mix which can safely support pavements yet allow tree roots to grow freely through it. Specifically, the invention teaches a matrix of stone and an acrylamide hydrogel slurry which suspends soil within the matrix pores.

BACKGROUND OF THE INVENTION

Soil compaction, which is necessary to safely support sidewalks and pavement, interferes with the needs of urban trees for usable rooting space to support healthy tree growth. For example, areas which often are planted with street trees (such as pedestrian malls) are often designed to withstand the compaction necessary for pavement stability under maintenance and emergency traffic yet do not provide ample rooting area. Without ample rooting area, the tree roots may cause sidewalk failure. When this occurs, the tree roots are usually directly below the wearing surface (the concrete of the sidewalk). This is usually the only area where moisture and air can be consistently available at levels conducive to root growth. The underlying layers are compacted to a level which usually prevents root penetration. Roots are known to be opportunistic and will grow where conditions are favorable.

Because lack of rooting space is arguably the most limiting factor affecting a street tree's water and nutrient demands over time, urban trees need to have access to larger volumes of soil if they are to achieve the size, function, and benefits for which we plant them. Urban soil compaction generally occurs in what would be the tree's preferential rooting zone: the shallow lens of soil no more than three feet deep extending well beyond the tree's canopy. Compaction contributes to insufficient rooting volumes by increasing the soil's bulk density and soil strength to levels which impede root growth.

While several reasons for densification and compaction of urban soils exist, the most ubiquitous problem is the purposeful compaction of the soil surrounding a street tree to support pavement or nearby structures. Compaction is necessary as a cost-effective way to increase the strength and stability of existing soil materials to prevent their settlement under or around designed structures. It increases the bearing capacity of the materials below the pavement system and reduces the shrinking and swelling of soils that occurs with water movement or frost action. Thus any effort to increase the rooting area for street trees under pavement must accept the necessity of compaction and understand the levels of compaction needed to safely design pavement structures.

When roots "escape" or outgrow their planting holes they usually choose zones of lesser compaction due to subsurface structures such as utility lines or the base course directly beneath the actual pavement where the open granular nature of the layer might contain enough voids to allow root growth. Sidewalk damage is caused from those roots which expand radially as they grow directly beneath the pavement since this interface can provide greater opportunity for root penetration and growth in comparison with the compacted layers below.

Street trees need a less dense rooting medium which allows roots to penetrate to a depth of two to three feet, but this is currently unacceptable under sidewalks from a structural safety viewpoint. Those trees that do not "break out" and often subsequently heave the sidewalk are sentenced to a limited future dictated by the limited amount of designed rooting volume within the planting pit or island. This volume is not likely to support the tree for the designer's and the public's expected life span as borne out by the high tree mortality rate found in planting areas surrounded by pavement; often dying in as little as 7 years.

SUMMARY OF THE INVENTION

The present invention relates to a rigid soil medium that will safely bear loads required by engineering standards yet still allow for rapid root exploration and growth. The invention accomplishes this by forming a stone matrix and suspending soil within the matrix pores. The present invention teaches how to develop a stone to soil mixing ratio for a particular stone and soil type.

The soil mix of the present invention is used as a pavement base for sidewalks and low traffic situations. It is designed to withstand the compaction necessary for pavement stability while providing a viable rooting medium, with depth, for street trees planted in close association with the pavement structure. By expanding the rooting zone of the urban street tree, an area known to be limiting to street trees currently, an increase in tree growth and vigor can be expected. By encouraging deeper tree rooting, the mix will minimize sidewalk failure. During testing of the system roots deformed to grow around the stone matrix rather than displace stones.

Once installed, sidewalks using the urban tree soil mix will radically increase the life expectancy of urban trees, improve the health of the urban forest, and potentially eliminate sidewalk failure due to tree roots. There is a potentially large market for this technology by municipalities and commercial concerns who want to increase the life expectancy and health of the tree populations under their care when the trees are closely associated with pavement. The blend can be used on a large scale and the mix can be made in any commercial concrete truck or blending plant. No specialized machinery is required for mixing; the major cost of its use is the excavation and removal of the material it replaces. However, during many reconstruction and infrastructure replacement projects, the excavation cost already exists, making this new urban soil mix a low cost technology with great long term benefits.

The present invention includes a method of producing a stone and soil subbase system for pavement that supports growth of tree roots. The type of stone and soil to be used in the subbase system is selected as well as the compactive effort to be used for compacting the subbase system. The materials are tested to determine a range of acceptable dry weight stone to soil ratios that allow growth of tree roots and have a load bearing capacity to have a California Bearing Ratio of at least 40 when compacted. The method also includes adding a hydrogel when mixing the stone and soil. The selected types of stone and soil are mixed at the determined ratio and installed as the subbase.

The dry weight stone to soil ratio can be determined empirically but is generally between 3:1 to 8:1. The stone can be selected from size specification #4 per ASTM C 33-93-Standard Specification for Concrete Aggregates (roughly 1.5 to 0.75 inch stone) and is preferably angular aggregate stone low in limestone. The soil can be selected from a loam with or without an additional organic matter fraction. Depending upon the system the soil can be engineered to minimize sand. The hydrogel is generally added at a concentration of between 25 and 40 grams of hydrogel per 100 kilograms of stone. In general, the compactive effort should be sufficient to bring the density to one hundred percent of standard AASHTO Peak Density (AASHTO T 99).

DETAILED DESCRIPTION OF THE PREFERRED EMBODIMENT

Figure 1:
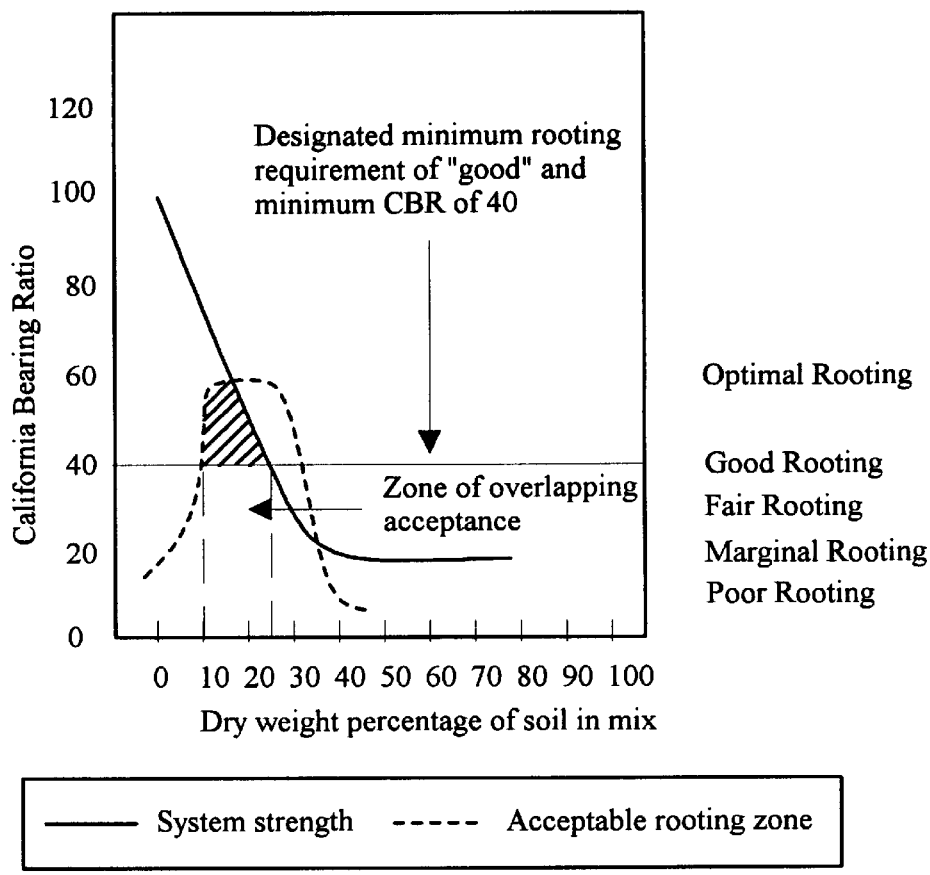
FIG. 1 shows a range of stone to soil ratios and the bearing strength and rooting potential for each mix.

The present invention includes an easily produced soil medium which meets engineers' specifications for load bearing capacity but still allow for vigorous root growth through the compacted profile, thus increasing overall rooting volume without compromising safety. This improves the compaction resistant planting media but with greater load bearing requirements. The present invention teaches a gap-graded, load bearing stone matrix that can meet the engineering requirements while suspending a noncompacted rooting medium within the voids created by the stones.

Knowledge of engineering terminology and testing requirements is useful for developing an understanding of this problem. Definitions and explanations of the engineering tests employed and reported are provided.

Proctor Density

The Proctor testing procedure describes the relationship between soil moisture, a standard compactive effort, and soil porosity (void space). As the soil moisture increases, a standard compactive effort yields progressively greater bulk densities (and fewer voids) up to an optimum moisture content for that compactive effort. After the optimum is reached, densities decrease with increasing soil moisture because the soil is held apart by the incompressible excess water in the test sample. Proctor Peak Density is the high point on a curve plotting the dry density of the soil against increasing moisture content as a result of a standard compactive effort arbitrarily set to simulate a compaction effort used in the field. The standard effort consists of the near equivalent of 25 blows from a 5.5 lb. hammer falling 1 foot onto each of 3 equal layers of material.

AASHTO & ASTM Tests

Since the equipment and compaction levels have changed since 1933, the use of the term Proctor density is not particularly accurate for many compaction specifications. A percentage of compactness relative to the peak density from a particular laboratory compaction test is more common. In general, this application refers to the peak density associated with the standard or modified AASHTO moisture-density relationship testing protocols [Association of American State Highway and Transportation Officials: T 99; T 180, 1996].

Two compactive efforts are described by the ASTM moisture-density relationship specifications and a third maximum density determination using a vibratory table can be used depending on the particle size of the material and the degree of compaction required for a particular use. [American Society of Testing and Materials: D 698; D 1557; D 4253, 1993]. The testing method used to generate the target density is important to note when processing a specification, since each method could yield a substantially different peak density and optimum moisture level. The moisture-density tests for AASHTO and ASTM are essentially identical.

Since the test for the moisture-density relationship is standardized, it is often used to generate a specimen from which to measure a material's shear strength, bearing capacity, and/or penetration resistance. This information can be used to evaluate and define a material for safe engineering design practices. In a sidewalk or parking situation, a failure could translate into large financial liabilities such as vehicle damage, personal injury, increased maintenance, or premature replacement costs.

California Bearing Ratio

With increasing density, there is usually an increase in soil strength. The moisture-density relationship is used to identify a standardized testing point for evaluating a material's load bearing capacity via the California Bearing Ratio (CBR) [American Association of State Highway and Transportation Officials: T 193-90, 1991; The Asphalt Institute, 1978]. This ratio compares materials used under pavements to a standard material which has been empirically determined to be a satisfactory pavement base [American Society of Testing and Materials: D 1883, 1993; Holtz, 1981]. This value is dependent on frictional strength; therefore, moisture content and bulk density are major factors in this testing procedure. A CBR value of 100 would be interpreted to mean that the tested material had the same bearing capacity as the reference standard (100 percent).

With the CBR value, the necessary pavement thickness can be determined by evaluating components of the soil profile materials for shear strength under pavement [American Association of State Highway and Transportation Officials: T 193-90, 1986; Chou, 1977; US Army Eng. Waterways Exp. Station, 1959]. Acceptable CBR values, based on laboratory or in situ testing, are assigned for each layer used in pavement systems with minimum acceptable bearing capacities increasing for each consecutive layer from the bottom toward the top surface grade. The subgrade often has a comparatively low CBR in the range of 5 to 10 [American Association of State Highway and Transportation Officials, 1986; Holtz, 1981]. Base materials are normally much stronger than the subgrade with acceptable CBR values ranging from 40 to 80 [Holtz, 1981]. These values could be considered acceptable for materials used under paved surfaces in light traffic situations which would include maintained municipal sidewalks.

A marginally acceptable or unacceptable base could have an acceptable CBR at field capacity and lower moisture levels normally found outside of the laboratory, but could fail in a saturated condition, which often occurs in the spring. For this reason, CBR tests are often subjected to a 96-hour soaking period to saturate the sample to simulate the worst case scenario.

The Competing Needs for Structural Integrity and Suitable Conditions for Tree Growth The base for sidewalks and roads must form a suitable structural structure, however, this traditionally means compacting the soil beyond a density which can be penetrated by tree roots. A natural tree root system is normally many times greater than the diameter of the tree's canopy and exists in a shallow one meter lens of soil, with the vast majority of the root system occurring within the top 30 cm of a natural soil profile. The larger structural roots often occur at shallow depths with smaller root branches extending upward into an organic layer of decomposing organic matter. A typical 4'×4' planting pit does not mimic this description.

Roots need oxygen for respiration, and they supply the nutrition and water supply for the tree, so all three demands must be met to allow roots to function normally and to prevent tree failure. Compaction of the soil destroys the larger, more unstable pores first, and the additional friction of the soil particles increases soil strength. High soil strength coupled with small pores can prevent root penetration which impacts the water and nutrient collection demands on the root. The small pore size could also negatively impact the root if the soil drains poorly thus limiting the oxygen supply available for root respiration.

Therefore, it is no surprise that when roots "escape" or outgrow their planting holes they usually choose zones of lesser compaction associated with sub-surface structures such as around utility lines, or the base material directly beneath the pavement wearing surface. Such areas often contains voids large enough for entry by root tips and provide an environment potentially acceptable for sustained root growth. It is common to observe sidewalk damage from radial expansion of roots growing directly beneath the pavement wearing surface.

Therefore, a system which provides a suitable structural support for the sidewalk or road and a suitable growing environment for trees is needed.

The Solution

To solve this problem, the objective was to develop an easily produced soil medium which would meet engineering specifications for load bearing capacity but still allow for vigorous root growth through the compacted profile. Gravel and fine textured materials were mixed so that loads would be transferred from stone to stone in the gravel while leaving the soil material between the stones essentially unaffected by compaction. The uncompacted soil material between the stones allows for greater water and air movement, and provides low-strength pathways within the stone matrix so roots would be encouraged to grow throughout the entire depth of the material. This medium can also reduce sidewalk failure, another goal of this system, by encouraging deeper root systems.

A series of studies were initiated to identify a promising stone to soil ratio that would meet these objectives. To achieve this end, two important principles were recognized. First, to prevent soil compaction and create the necessary air filled porosity, the volume of soil in the stone and soil mix must be less than the total porosity of the compacted stone matrix. At this point, the bearing capacity of the system would largely become a function of the strength of the stone alone. The determination of this point is a critical step in the definition of the medium for a particular system. Second, the soil could not be allowed to settle to the bottom of the stone matrix during the mixing or compaction phases of its installation. A small amount of a hydrated hydrogel was added to the stone matrix before blending in the soil to prevent the stone and soil from segregating. The hydrogel was to act as a glue, tacking the soil to the stone much as a tackifier is used for hydroseeding applications on slopes.

The Stone to Soil Ratio

Assuming that the stone and water in such systems is incompressible, then there is a critical stone to soil ratio. Below this critical ratio (i.e. too much soil), the excessive soil in the system would either be compacted, substantially inhibit the formation of the stone matrix, or affect the engineering properties of the total system. By having more soil in the system than could be accommodated by the pores in the compacted stone matrix, the soil would become compacted. In this case, the stones would "float" in the compacted soil and not come into contact with other stones, thus preventing the bridging of the stones which form the load-bearing stone matrix. In this situation, the engineering behavior would be that of the soil and not of the stone, and the soil would be compacted to the same problematic levels in order to bear the loading.

Due to the small amount of soil in the proposed system, changes in the stone to soil dry weight ratio can be relatively large before the stone matrix is altered to a low strength condition, but there exists an identifiable lower critical ratio which will prevent a strong matrix formation and an upper ratio which would limit plant available water and nutrients. Since the upper level of the ratio minimizes the soil which is needed for tree root growth, efforts have been concentrated on the lower critical point.

Critical dry weight stone to soil ratios are different than mathematically expected, but can be determined through routine empirical analysis as described below. The ratio changes for different stone types and shapes as well as for different types of soils used. The assignment of this ratio is linked to the strength of the compacted mix, stone matrix formation, the water permeability and aeration characteristics of the system, and the potential for root growth after compaction. An overlapping zone of acceptable ratios for all of the mentioned considerations produce a working solution.

As the fine materials in the soil are added to the stone matrix, the matrix forms differently. As the stone and soil are mixed and compacted, the soil is unavoidably compacted to some extent. This happens even when the stone matrix pores were only partially filled with soil. With the introduction of hydrogel into the system, incompressible water held by the hydrogel acts as another compactive force on the soil within the system.

Since this is a dry weight ratio, the particle density of the stone and soil used will have a direct effect on the critical ratio. Highly angular stone has a larger matrix porosity and will accept additional soil volumes when compared to a rounded stone. Porosity of compacted gravel samples have been shown to increase by upwards of nine percent with increasing particle angularity. Since the critical stone to soil ratio will be affected by the stone type and by soil type, a generalized critical stone to soil ratio or equation for any particular parameter is difficult to identify, however, the necessary relationship is easily defined. As the ratio of stone to soil is varied on a dry weight basis, both the structural capacity (CBR) of the soil-stone system and its ability to support root growth change.

FIG. 1 shows a graph of the CBR and the rooting conditions as the stone to soil ratio varies for a particular stone and soil type. The examples provided below teach how to determine optimal rooting conditions and CBR is determined by the standardized tests described above. An acceptable CBR above 40 is found when soil forms 25% or less of the dry weight of the stone-soil mix. Good rooting occurs when soil forms between 10% and 35% of the dry weight of the stone-soil mix. As shown, there is an overlapping zone of optimal rooting and CBR when soil forms between 10% and 25% of the dry weight of the stone-soil mix. This zone will change with various soil and stone types.

Figure 3:
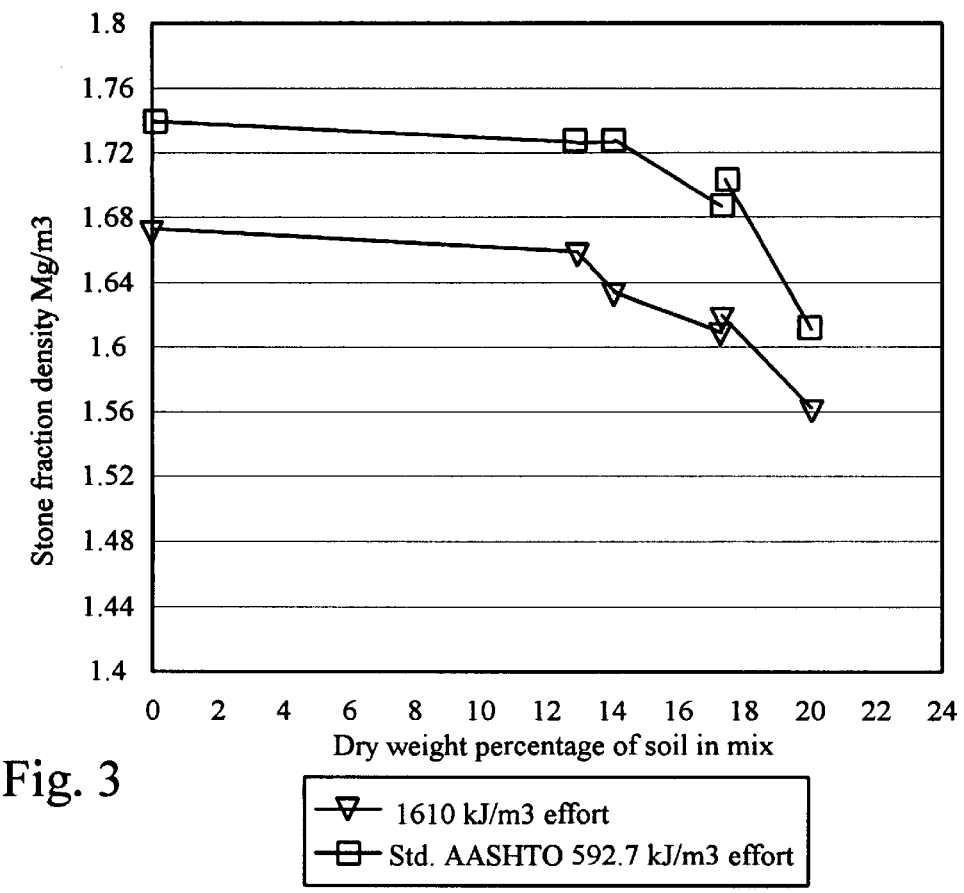
FIG. 3 shows the effect of the increasing the soil percentage of a stone soil mix on density after various compactive efforts.

FIG. 3 shows the density of the stone fraction at the standard AASHTO and 1610 kJ m$^{-3}$ peak densities. The compacted stone without soil and the five SSRs are represented using the soil fraction as a percentage of the stone-soil system as the independent variable. A definite reduction in the stone matrix density can be seen with any addition of soil in the system at the tested levels, but its effect on load bearing capacity is not as clear. No critical value can be definitively determined from the stone density alone. In all cases, a CBR of 40 or greater would be considered acceptable.

Figure 4:
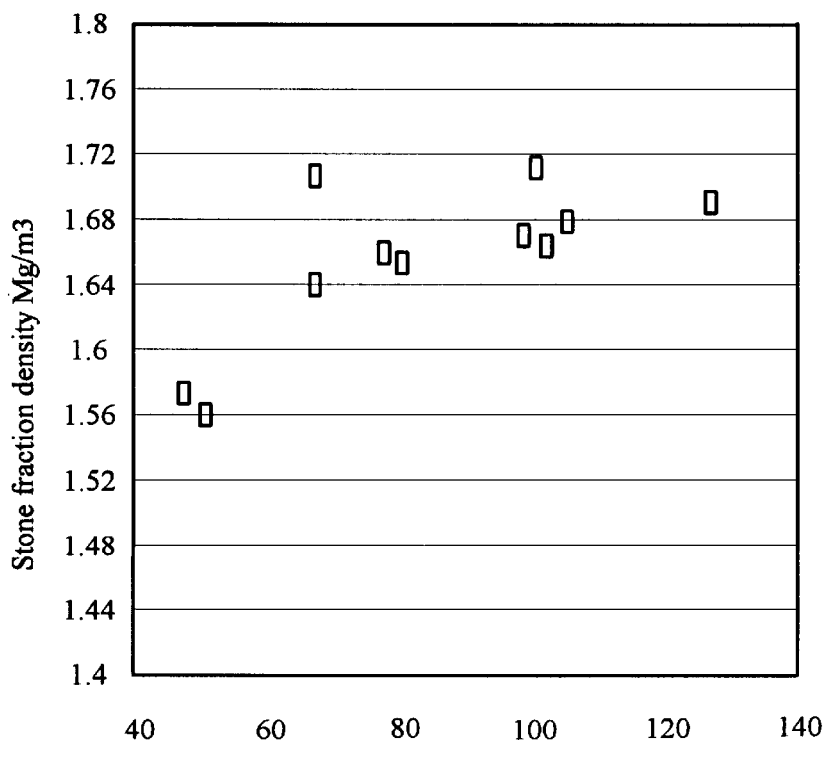
FIG. 4 shows the relationship between stone fraction density in compacted similar limestone/clay loam mixes and their CBRs (California Bearing Ratio).
Figure 5:
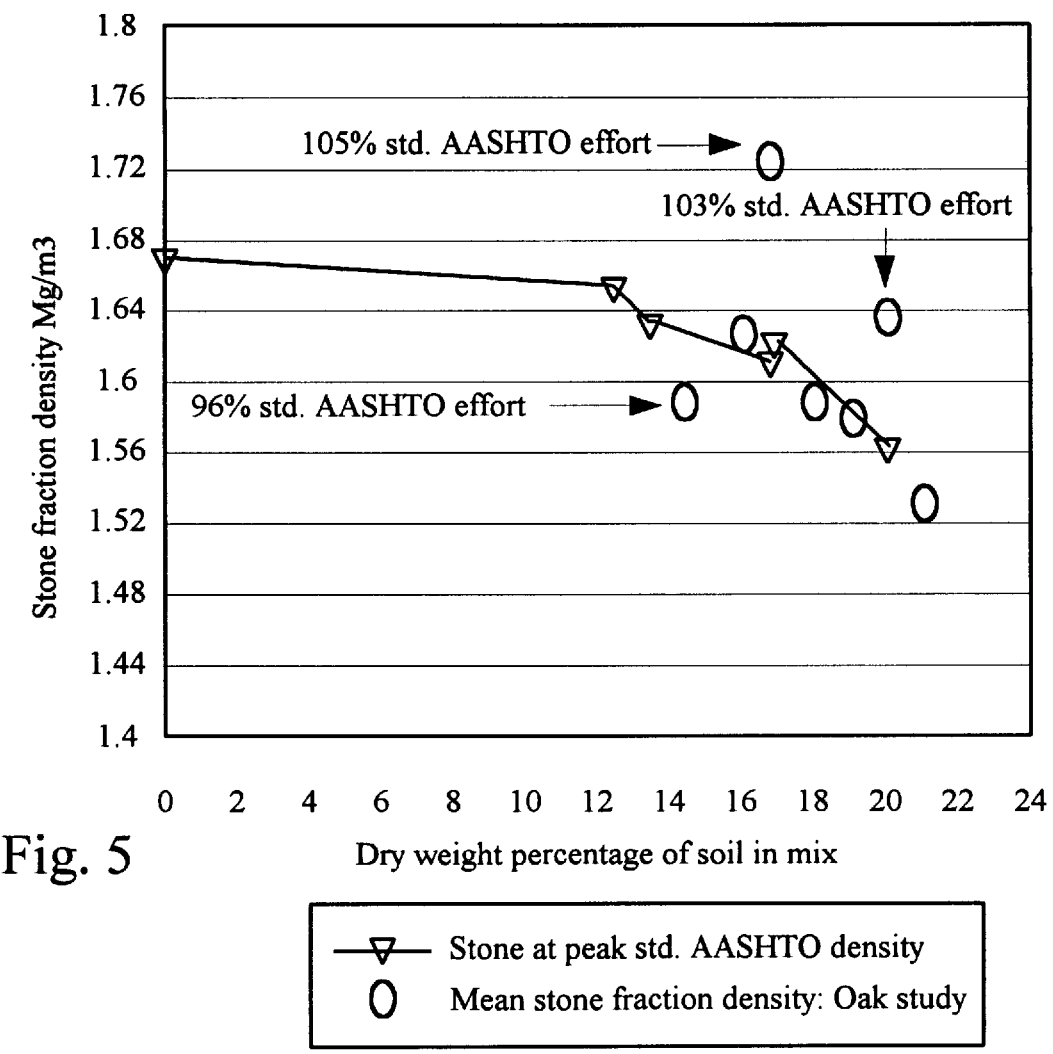
FIG. 5 shows data demonstrating the negative impact of increasing soil percentages on stone matrix formation as measured by stone fraction density.

FIG. 4 shows the relationship between stone fraction density in compacted similar limestone/clay loam mixes and their CBRs. From this relationship it was inferred that the oak media (discussed in detail below) had acceptable bearing ratios ranging from 40 to 80 since they consisted of stone fraction densities between 1.58 and 1.72 Mg m$^{-3}$. FIG. 5 shows data demonstrating the negative impact of increasing soil percentages on stone matrix formation as measured by stone fraction density.

Hydrogels

Hydrogels are a group of polymer materials which adsorb large quantities of water in relation to their unit size. There are several groups of hydrogels, but most can be divided into either starch based or acrylimide base hydrogels; this project utilized the latter. Within the acrylimide hydrogels, large differences in hydration rate and release of water can be produced. Small changes in the organic structure of the monomer, and the method of linking the units into the acrylimide polymer can produce various specialized properties for any individual hydrogel.

The product used in this series of studies was a cross linked potassium copolymer, using a polymer, salt linkage (Gelscape®, Amereq Corp. Congers, N.Y.). This technology was utilized for its reasonable hydration time, its large granule size, and its specific design as a soil amendment. When a dry grain is exposed to water, its affinity for water is extremely high. As the water contacts the crystalline structure, it explodes, creating a large void in the center of the crystal, which sucks in the water. The water is then weakly held in the soil against the force of gravity, but theoretically still available to the plant root. The material can be sticky when partially hydrated, and has been used as a tackifier in hydroseeding applications on moderate grades.

The present invention includes a method of producing a stone and soil subbase system for pavement that supports growth of tree roots. The type of stone and soil to be used in the subbase system is selected as well as the compactive effort to be used for compacting the subbase system. The materials are tested to determine a range of acceptable dry weight stone to soil ratios that allow growth of tree roots and have a load bearing capacity to have a California Bearing Ratio of at least 40 when compacted. The method also includes adding a hydrogel when mixing the stone and soil. The selected types of stone and soil are mixed at the determined ratio and installed as the subbase.

The dry weight stone to soil ratio can be determined empirically but is generally between 3:1 to 8:1. The stone can be selected from size specification #4 per ASTM C 33-93-Standard Specification for Concrete Aggregates (roughly 1.5 to 0.75 inch stone) and is preferably angular aggregate stone low in limestone. The soil can be selected from a loam with or without an additional organic matter fraction. Depending upon the system the soil can be engineered to minimize sand. The hydrogel is generally added at a concentration of between 25 and 40 grams of hydrogel per 100 kilograms of stone. In general, the compactive effort should be sufficient to bring the density to one hundred percent of standard AASHTO Peak Density (AASHTO T 99). The present invention was tested as described in the following examples.

EXAMPLE 1

Root Penetration

The primary objective of this study was to test the hypothesis that roots can penetrate and grow through a rigid gap-graded stone-soil mix to a greater degree than a compacted soil typically found in a pavement subgrade. Since there was no previous work identifying such a stone-soil mix treatment, the experiment was designed to test several treatment variables.

Initial studies using three stone types and various stone to soil ratios showed that the compacted-soil test media (dry densities>1700 kg/m$^3$) increased root growth by a minimum 320% over the compacted clay loam control (dry density of 1378 kg/m3). The proposed system can safely bear load demonstrated by California Bearing Ratios consistently exceeding 40.

The three types of stone chosen for the initial tests are described in Table 1. Crushed limestone was chosen for its angularity and consistency as a manufactured material. A high frictional quarried gravel was chosen for its predominantly round shape. A third stone type, Solite® (a heat expanded slate), was chosen for its rigid nature, light weight, and porosity. The crushed and quarried stones conformed to a 0.5–1.0 inch gravel size range which was purchased as a #2 size stone. A clay loam was chosen for the interstitial soil component of the mix because of its water and nutrient holding capacity, a critical factor in a mostly stone root environment. Twelve blends were used in this first test representing four increasing stone:soil volumetric ratios for each of the three stone types.

TABLE 1

Materials used in developing test blends

| Material Used | Specific gravity (Gs) | % passing 38.1 mm sieve (1.5") | % passing 25.4 mm sieve (1.0") | % passing 12.7 mm sieve (0.5") | Uniformity Coefficient (Cu) | Description |
|---|---|---|---|---|---|---|
| #2 Crushed Limestone | 2.71 | 100 | 94.1 | 6.7 | 1.4 | all angular stone |
| #2 High Friction Aggregate | 2.66 | 100 | 98.8 | 3.2 | 1.3428 | round quarried gravel; oversize crushed and blended back; % limestone = 16% |
| Solite ® | 1.5 | >90 | 83 | <5 | 2 | exploded slate, very porous; blended to approximate particle size distribution as the other tw stone types |

TABLE 1-continued

Materials used in developing test blends

| Material Used | Specific gravity (Gs) | % passing 38.1 mm sieve (1.5") | % passing 25.4 mm sieve (1.0") | % passing 12.7 mm sieve (0.5") | Uniformity Coefficient (Cu) | Description |
|---|---|---|---|---|---|---|
| Soil | 2.58 | — | 26.4% sand; 40% silt; 33.6% clay (USDA) | — | — | shredded clay loam; dry bulk density - 1110 kg/m$^3$; plastic limit = 20.5; liquid limit = 27.5; std. proctor peak density - 1674 kg/m$^3$; pH = 5.25 |

To determine stone to soil ratios, the percentage of voids within a matrix of each stone type were measured. Five random samples from each stone type were placed into containers of known volume and brought to a saturated, surface dry condition. From this point, a loose pack porosity was determined for each stone type by measuring the amount of water needed to fill the container containing the stone sample. The mean of five measurements determined the noncompacted matrix porosity of 44.7% for the crushed limestone, 40.0% for the gravel, and 47.8% for the Solite®.

For each stone type, four mixes were generated by adding enough clay loam to fill 100, 90, 80, and 70% of the measured noncompacted porosity. The resultant blends are listed using a dry weight ratio as shown in Table 2. The dry weight ratios varied due to the different specific gravities of each stone type (Table 2). The Unified Soil Classification System was used to define each blend and to predict their performance in an engineering context. Densities were measured at the end of the study. Overall standard error of density by treatment was 24.69 kg/m$^3$ excepting where single replicates had died (X), in which case the standard error was 27.04 kg/m$^3$.

TABLE 2

Description of Study Media

| Stone Type | Dry Weight Stone to Soil ratio | Observed Dry Density (kg/m$^3$ - % P.O.D.) without hydrogel | with hydrogel | % Actual Porosity without hydrogel | with hydrogel |
|---|---|---|---|---|---|
| Limestone | 3.68:1 | 1789 | 1594 | 33.4 | 40.6 |
| Limestone | 4.09:1 | 1767 | 1571 X | 34.2 | 41.5 |
| Limestone | 4.60:1 | 1748 | 1602 | 35.0 | 40.4 |
| Limestone | 5.26:1 | 1638 X | 1594 X | 39.1 | 40.8 |
| High Friction | 5.47:1 | 1823 | 1681 | 31.2 | 36.5 |
| High Friction | 6.03:1 | 1812 | 1692 | 31.6 | 36.2 |
| High Friction | 6.84:1 | 1852 | 1716 | 30.1 | 35.3 |
| High Friction | 7.81:1 | 1784 | 1723 | 32.7 | 35.0 |
| Solite ® | 1.46:1 | 1269 | 924 | 34.7 | 52.4 |
| Solite ® | 1.70:1 | 1216 | 1132 | 36.1 | 40.5 |
| Solite ® | 1.78:1 | 1226 | 1154 | 35.2 | 39.0 |
| Solite ® | 2.09:1 | 1153 X | 1122 | 37.8 | 39.4 |
| Clay Loam Control | — | 1378 X | 1248 | 46.8 | 51.8 |

Each of these blends was also blended with a polyacrylimide hydrogel tackifier (Gelscape® Amereq Corporation) to prevent aggregate separation during the mixing and compaction of such gap-graded mixes. The tackifier was used at a rate of 38 grams per 13650 cm$^3$ of uncompacted mix (approximately 152 grams hydrogel per 100 kg stone on a dry weight basis). Compacted clay loam with and without hydrogel served as the controls for a total of 26 treatments with six replications.

Each mixture was blended in a small rotary concrete mixer in two batches and then combined. For each blend, six 14218 cm$^3$ nursery containers (#5 short) were filled for a single lift compaction. Excess material was stored to fill settlements after the initial compactive effort. The containers were fitted with a 6×20 cm PVC tube wrapped in cheese cloth which served as a 565.5 cm$^3$ place holder for the planting hole. The cloth prevented materials from failing into the tube. The tube was removed after the compaction process. This prevented undue disturbance of the compacted profile while allowing for a planting hole. The tubes were placed slightly below the plane of the top of the container to prevent vibratory effects during compaction. The containers with the stone-soil blends were then compacted.

To compact the test blends, all containers were blocked pot to pot and covered with a geotextile. The geotextile was covered with a 1.5 inch layer of 42 stone and then compacted with a vibratory plate tamper (Wacker VPG 160K). The fabric and stone deformed into the containers as the media settled, maintaining media/tamper contact for uniform compaction. Compaction consisted of four passes with the plate tamper; care was taken to pass the center of the tamper over all edges of the block for uniformity of compactive effort. The coverings were removed, and the initial excess test blend was replaced into the containers where settlements had occurred. The pots were again covered and four more passes with the tamper were performed. Controls were compacted in four lifts with an impact hammer method instead of a vibratory plate tamper due to the fine nature of the clay loam. During the plant harvest, the final densities and porosities were calculated (Table 2).

On June 9, dormant *Tilia cordata* seedlings with swollen buds were standardized to a single stem of 50 cm. The root systems were standardized to a single root of 15 cm with all laterals and root tip removed. Planting tubes were slid out of the compacted containers, and findens were installed with the same shredded, noncompacted clay loam as was used to fill the interstitial voids in the stone-soil mixes. Plants were watered in after planting and placed into a completely randomized experimental block. They were grown on an outdoor gravel pad in Ithaca, N.Y., kept weed free, and watered as needed until the end of August.

Plants were forced into an early dormancy after the trees had set terminal bud by placing them into a 6 Centigrade cooler on August 31. After approximately three months of chilling, the plants were placed into a greenhouse in a completely randomized experimental design on December 8. The plants received 16 hour day lengths using supplemental incandescent lighting. The greenhouse temperatures were maintained at 21° C./15.5° C. day/night and plants were watered as needed.

The trees were harvested beginning on March 28, once they had again set terminal bud. At harvest, the final volume of each test container was calculated by taking the average of four measurements from the top of the container to the soil surface (one from each quadrant of the container), and subtracting the empty volume from the total pot volume. The final weight and moisture content was measured and the final dry density calculated.

The root harvest consisted of a total root excavation and collection. The initial standardized root was removed, and the remaining roots were washed free of soil. The volume of new root growth was measured using water displacement in a graduated cylinder. The roots were viewed as cylinders with a diameter equal to the average root diameter which was estimated to be 1.5 mm yielding an average root radius of 0.75 mm.

By taking the water displacement of the roots as the volume of these root cylinders, root lengths were calculated (Table 3) from the following constant relationship. Length (cm)=Volume $(cm^3)/(\pi(0.075\ cm)^2)$. This transformation was done to more effectively communicate root growth by length rather by volume. Since the data was transformed by a constant factor, any treatment differences were not obscured or developed. Plants were harvested following the randomized design. Due to the number of plants and the painstaking nature of the root excavation, the harvest lasted from March 28 to April 29. Overall standard error by treatment was 348.4 cm excepting where single replicates had died (X), in which case the standard error was 381.6 cm.

TABLE 3

Response of root length by treatment

| | | Average Root Length (cm) | |
|---|---|---|---|
| Stone Type | Stone:Soil Ratio | without hydrogel | with hydrogel |
| Limestone | 3.68:1 | 1971 | 3216 |
| Limestone | 4.09:1 | 2264 | 1879 (X) |
| Limestone | 4.60:1 | 2047 | 2839 |
| Limestone | 5.26:1 | 1947 (X) | 2773 (X) |
| High Friction | 5.47:1 | 2377 | 2584 |
| High Friction | 6.03:1 | 2509 | 1999 |
| High Friction | 6.84:1 | 1981 | 3103 |
| High Friction | 7.81:1 | 3169 | 2462 |
| Solite ® | 1.46:1 | 2528 | 2726 |
| Solite ® | 1.70:1 | 2811 | 2084 |
| Solite ® | 1.78:1 | 2113 | 2226 |
| Solite ® | 2.09:1 | 2467 (X) | 2433 |
| Clay Loam Control | — | 586 (X) | 3640 (X) |

Roots in the compacted nonhydrogel controls were observed only in the initial noncompacted planting tube area except in one replication. In the one replicate where roots did penetrate the soil, roots followed the interface between two lift compaction zones and grew toward the side of the container but did not reach it.

In all other stone and soil test media the roots were observed to reach the bottoms and the sides of the containers throughout the entire profile. Occasionally, roots were seen to grow around zones of poor aeration where uneven mixing left high concentrations of hydrogel. This problem was observed in 4 replicates of the mix containing the highest proportion of soil (4.09 parts limestone to 1 part soil) with hydrogel. Mycorrhizae were observed in nearly all test containers, with exceptions occurring randomly across the entire range of test media.

Root growth was impeded in the control without hydrogel compared to all other blends and the addition of hydrogel to the control increased root penetration by 621% over the nonhydrogel control (Table 3). The bulk density of the clay loam with hydrogel was 1.25 as opposed to 1.38 Mg $m^{-3}$ without hydrogel (Table 2). This could be attributed to swelling of the hydrogel in the soil separating the soil aggregates reducing the dry density of the soil. This would also create relatively large pores which would allow for vigorous root growth.

Using a general linear model on the stone based media, there were no significant differences in root volume between stone types, stone to soil ratios, or presence of hydrogel. No interaction between the three variables was found. All of the stone-soil mix treatments significantly improved root growth when compared to the non-hydrogel control ($p<0.001$). Root length in the stone-soil blends ranged from 1879 cm to 3216 cm, an improvement of 320–548% over the soil control.

Visual evidence suggested that the hydrogel did work as planned comparing like mixes with and without gel. The soil was observed to move down through the profile when the hydrogel was absent, leaving an open stone matrix at the surface. The hydrogel rate used in this study was approximately 150 g hydrogel/100 kg stone. If the hydrogel absorbed 200 times its weight in water and the system had been compacted with a standard AASHTO compaction effort, then the hydrogel would have been able to hold enough water to prevent the anticipated formation of the stone matrix due to an inflated moisture content falling above the optimum. Water absorption for this product is usually in excess of 400 times its weight in water so the negative effect of the hydrogel was considered a plausible possibility. This evidence was strong enough to make the tackifier a component in all subsequent studies to date, but at a substantially lower rate. After compaction, the swelling of the hydrogel was observed to lift stones above the plain of the top of the container. This was not an isolated event and evidence of this lift was seen periodically throughout the study in all three stone types. This visual evidence after planting indicated that the rate of hydrogel used was excessive for the proposed stone-soil system. As a result, no measurements of aggregate segregation were made.

All of the blends in the study were classified as gravel—silt mixtures/clayey gravels. The Solite® mixes contained significantly higher amounts of material in the silt and clay fractions by weight. Based on the Unified Classification of the blends, it would appear that the non-Solite® stone-soil blends would likely serve as an excellent subbase and possibly a good base at the higher stone to soil ratios.

Although Solite® blends seemingly contained more fine grained material than the non-Solite® stone blends, care should be taken before discounting the Solite® since the classification was based on the weight of the particles and Solite®, being a heat expanded slate, was very light per unit particle size when compared to the clay loam due to entrapped air voids within the aggregate. Observations of root growth indicated that Solite® behaved similarly to the other stone types; however, the validity of extending this similarity to material behavior would be questionable until the strength and durability of the material under load was tested and a need for lightweight offsetting the additional expense can be demonstrated.

There were obvious increases in root growth over the control in all treatments. This demonstrates that the stone matrix can be used to successfully sustain tree root growth. This system will allow root penetration and normal short term growth over a wide range of stone to soil ratios when compacted. The abundant presence of Mycorrhizae indicate that all of the compacted stone-soil blends provided a healthy root environment.

Example II—English Oak Study

The first plant study established linden seedlings in stone-soil mixes compacted to densities untested for load bearing potential. There were no noticeable differences in plant growth between the stone to soil ratios (SSR) for any of the mixes except when compared to the compacted clay loam control. A plant study using English oak (*Quercus robur* L.) attempted to address the limitations of the previous test by compacting a wider SSR range of limestone blends compacted to the higher level of relative compactness.

The clay loam would likely impede root growth if compacted with the same effort as the stone-soil mixes, so it was treated with five levels of compactive effort to show the effects of increasing compaction efforts and the resultant densities on English oak root penetration. The data from the five clay loam treatments were then compared to the limestone mixes.

The study was to demonstrate the ability of the stone-soil system to allow tree root penetration and growth when compacted sufficiently to demonstrate acceptable load bearing capacity. Seven stone-soil mixes were compacted with a standardized effort of 594.441 kJ/m3.

Root impedance at the lowest SSR was expected. The root impedance would be due to compaction of the soil. As the stone matrix formed during the compaction effort, the soil would be compacted until the stones came into contact and "locked" into position. Since the SSR of 4:1 was observed to be approaching a likely critical lower boundary in relation to load bearing capacity in lab testing, this became an intermediate treatment level in this study with one treatment below at SSR 3.8:1.

For an objective control, the clay loam was chosen as a representative subgrade material. The negative impacts of minimal compactive efforts in relation to root penetration were to be demonstrated. Since a non-compacted subgrade would not represent a true control, and a fully compacted dry hydrogel per 100 kilograms of stone. All treatment replicates were compacted in place using an impact method of compaction.

The containers for this plant study were fabricated from 15.24 cm (6 inch) inside diameter schedule 40 PVC pipe. These sections of piping were cut into 35.56 cm sections (14 inch) to approximate the depth of three ASTM D-698 method D molds. The bottoms of the tubes were left open to allow free drainage from the test profile. After the mold was compacted, a section of cheesecloth was temporarily placed onto the base of the tube and held in place by a rubber band to prevent materials falling from the tube during placement into the testing block. It was possible to remove all of the cloth when placing the tubes into the test area except for the non-compacted clay loam controls.

Materials were deposited into these containers and compacted. The mold was held in place by a taller version of the base plate used in the ASTM testing protocol, fabricated to accommodate the planting tubes for this project. The impact hammer was the same hammer used for the standard AASHTO moisture-density test. No attempt was made to minimize the possible interface between compaction layers, since this would have resulted in an unknown diminishment of the compactive effort. The final three layers of each mold were filled and compacted with a 1.9 cm (0.75 inch) diameter by 12.7 cm (5 inch) place holder for the oak seedling, leaving a 36.2 cm$^3$ cylindrical planting tube for the standardized root system. The numbers of hammer blows per layer were diminished in these layers to hold the compactive effort as constant as possible for the entire profile. For example, if the compactive effort normally consisted of 56 hammer blows per layer, the final three layers would experience 52.

Seven stone to soil ratios were tested in the stone-soil mixes. The hydrogel rate, stone type, and soil type were held constant. Table 4 describes all test treatments in terms of the mean of the seven replicates for SSR, mean compactive effort, mean resultant dry density and moisture content at time of compaction. Seven replicates of each SSR were tested in the study.

TABLE 4

Description of the stone-soil systems used in the oak study

| SSR | Mean compactive effort (kJ m$^{-3}$) | % standard AASHTO compactive effort | % gravimetric moisture content during compaction | Mean replicate dry density by treatment (Mg m$^{-3}$) | Mean stone matrix density (Mg m$^{-3}$) | Weight percentage of soil fraction |
|---|---|---|---|---|---|---|
| 3.82:1 | 591.993 | 99.9  | 13.2 | 1.928 | 1528 | 20.8 |
| 4.06:1 | 607.513 | 102.5 | 8.9  | 2.042 | 1638 | 19.8 |
| 4.34:1 | 592.702 | 100.0 | 9.8  | 1.944 | 1580 | 18.7 |
| 4.66:1 | 587.768 | 99.2  | 7.85 | 1.927 | 1586 | 17.7 |
| 5.03:1 | 622.799 | 105.1 | 9.9  | 2.066 | 1723 | 16.6 |
| 5.47:1 | 589.506 | 99.5  | 8.55 | 1.923 | 1626 | 15.5 |
| 5.98:1 | 568.804 | 96.0  | 9.09 | 1.85  | 1585 | 14.3 | subgrade would likely entirely stop root penetration, a range of densities for the control soil were chosen. The series of compacted clay loam treatments in this study was an initial attempt to demonstrate how easily root penetration in a given soil system can be negatively impacted by a compactive effort.

The clay loam soil that had been used in all previous studies was again employed for this experiment. The stone used in the stone-soil mixes was #2 crushed limestone. The hydrogel rate used in the stone-soil mixes was 38 grams of The clay loam was tested with five increasing compactive efforts serving as the test variable. There were ten replicates for each of the clay loam treatments. The increase in compactive effort to the control yielded higher densities which impeded root penetration verifying that protection of soils for future planting during construction is warranted. While the results were not surprising, they did establish a set of benchmarks which help to evaluate the proposed stone-soil mixes.

Three subsamples of approximately 300 grams were collected during the compaction of the treatment set to monitor compaction moisture content of the stone-soil mixes. Moisture content was constant within one percent over any given treatment compaction set. Since the materials were mixed and stored prior to compaction differences in the moisture content between different SSR mixes occurred. The moisture content for the clay loam compaction treatments were determined from 300 gram subsamples taken before during and after the compaction of each treatment set and varied by 0.25 percent over each compaction treatment set.

All treatment blocks were planted on May 9 with English oak seedlings which had been standardized by trimming the root system to a 5 inch main root with some secondary roots attached. The terminal bud of each seedling was removed. The planting space provided was filled with noncompacted clay loam and watered. All test plants were placed into final arrangement outdoors in Ithaca, N.Y. on June 1 after it was ascertained that all transplants had survived.

The plants were split into two Latin squares of 25 for the clay loam tests and a Latin square of 49 for the stone-soil tests. The design was chosen to account for time interval of harvest and for proximity to a nearby greenhouse with supplemental lighting.

The experimental blocks were placed on a double layer of geotextile used as a weed barrier and a root barrier for the test trees. The plants were watered as needed throughout the growing season with overhead irrigation by hose. During the month of December, the plants were covered with a temporary hoop structure and a polyethylene film tent to prevent damage to the root systems from cold.

The oaks were harvested as complete squares in periods of eight hours or less, negating the need for the time blocking factor of the Latin square. To harvest each tree, the entire test sample was removed from the open ended tube, placed on a screening sieve to catch any roots which may have broken away from the rest of the tree, and sprayed with water from a hose to wash away all of the stone and soil. The stone-soil mixes were harvested on December 19. The soil blocks were harvested on December 12 and January 12.

The roots were collected, discarding any roots that had grown in the small planting tube which had not been compacted. Of the roots that had penetrated the test treatment, the fine roots were defined as any root less than 1.22 mm diameter and were separated from the rest of the collected roots; those that remained were defined as coarse roots. The volume of each fraction of the root system was measured by recording the fresh root displacement of water. The roots were then dried to a constant weight at 70° C., and their weights were recorded.

There was no row effect from the proximity to the greenhouse found in either soil testing block. The column effect to account for time of harvest was not needed since each set of trees were harvested in a period of hours. A column effect could be measured, but this was completely due to the large range of root growth in the second treatment level. All analyses were conducted using ten replicates for each treatment since no blocking effects were found.

The materials used in the oak study were well compacted and would likely demonstrate the strength needed to be used as a pavement base. If the soil component had increased beyond that of the oak study blend SSR 3.82:1, a stone matrix needed to support load would be difficult to produce with a standard AASHTO compaction effort. (See FIG. 5)

Figure 2:
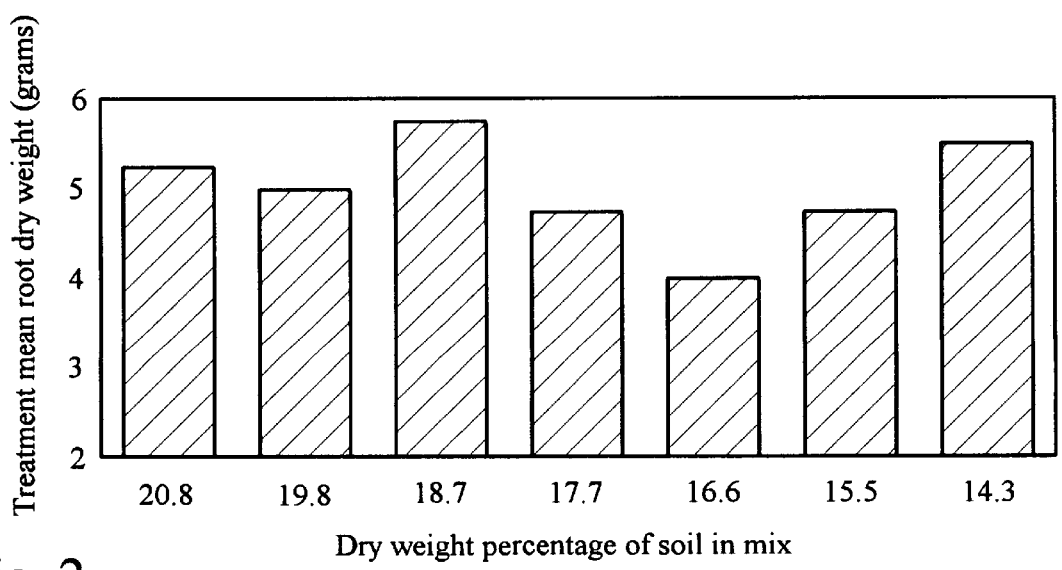
FIG. 2 shows the total root system weight by various treatments during a study of English oak root growth in stone-soil systems of the present invention.

FIG. 2 shows the total root system weight by treatment. There were no detectable differences in root penetration between any of the stone-soil mixes. In all stone-soil mixes, roots were observed to deform, flattening around the stones in the lattice and resume a normal cylindrical shape once past the stone obstacle. There were no trends in root penetration following density or SSR. There was no apparent interaction effects of SSR and density on root penetration. The root penetration, as quantified by total weight of penetrating roots, of the compacted stone-soil systems compared well to the soil treatments which had received minimal compactive efforts. There was a 200 percent increase in root penetration compared to the clay loam compacted above 1.5 Mg m$^{-3}$. Root penetration was effectively stopped when the soil dry density exceeded 1.6 Mg m$^{-3}$. The peak standard AASHTO density for the soil tested was 1.674 Mg m$^{-3}$. The clay loam was supposed to represent a typical subgrade material. The improvement of the stone-soil mix over a typical subgrade where roots are supposed to grow is very significant, but not truthfully measurable as root penetration was stopped at the soil dry density expected for a compacted subgrade of the representative soil material.

The critical stone to soil ratio as it related to root growth was not observed since roots were not impeded in any of the compacted stone-soil systems. However, the critical ratio for this stone-soil system as it affected the stone matrix formation was approached. It is possible that the system was more sensitive to the established load bearing requirements than it was to short term oak root penetrability.

Some level of soil compaction was apparently not detrimental to root penetration. The compactive effort in this case might have stabilized the soil profile and prevented the dispersion of the soil aggregates during the initial irrigation events. The aggregation was a result of the soil shredding process. Some compaction of the soil was likely in the lower SSR treatments in the stone-soil mixes as the stone matrix formed. However, the soil within the stone matrix would not reach the density observed to impede root penetration until a SSR below 3:1 occurred, assuming that the stone matrix could eventually be forced into a same arrangement at that high of a soil component. The interstitial soil density of the three lowest SSRs tested were 0.918, 1.02, and 0.873 Mg m$^{-3}$ as compared to the uncompacted soil dry density of 1.01 Mg m$^{-3}$ before mixing. The results of this study show that this system is exceptionally robust from a plant root penetration perspective.

The stone-soil system is an improvement over existing subgrade materials as represented by the clay loam soil. The subgrade can often occur within eight inches of the wearing surface of many sidewalks. Since the compaction of subgrade materials is so detrimental to root penetration in many cases, this system could be a large improvement over existing practices.

Engineering A Suitable Stone-Soil System

To design a suitable stone-soil system two major factors are considered. The determination of a base material's load bearing capacity or strength is critical for predicting pavement stability and, by extension, public safety. Second, the materials ability to allow root growth is also critical.

The California Bearing Ratio (CBR) is a method to measure the relative shear strength of base materials to judge potential pavement base efficacy. The CBR can be used to estimate the modulus of subgrade reaction which describes the stiffness of a given material in terms of the loading per unit of material deflection. For concrete pavements, this modulus can be used to calculate the thickness of concrete that is required to support a given wheel load [American Association of State Highway and Transportation Officials, 1986]. The CBR has been directly used to design pavement thickness for structures in various trafficking situations and also follows trends which can be associated with the Unified Soil Classification [US Army Engineering, 1959; US Army Engineering, 1960].

The proposed use of the stone-soil mix of the present invention is primarily targeted for sidewalk and pedestrian mall bases and needs to support maintenance and emergency vehicle traffic as well as pedestrian traffic. The CBR is as a reasonable method of assessing the stone-soil system for stability under light traffic situations.

Initial determination of the engineering properties of the blends was accomplished through the testing of the limestone based media, which was chosen for its manufactured consistency. A series of limestone media were blended in batches in the same manner as described in Example I. Blends were based on a 100 kg stone component contribution. Based on the previous observations, the initial hydrogel tackifier rate was thought to be higher than needed and was therefore reduced to 38 g of hydrogel per 100 kg of stone in the engineering tests.

The mixes tested in the engineering phase of the study represented stone to soil ratios ranging from 4:1 to 7:1 (Table 5).The mixes also represented a range which would start to define a critical stone to soil ratio and maximize the soil component of the system.

In the remaining ten samples, the CBR values covered a range of 60 units (a very wide range) over densities that varied from 1946 to 2081 kg/m$^3$ (a very narrow range). This difference in range could be caused by uneven stone breakage during the test. The surface area of contact of the piston and the depth of the penetration affect the measured CBR as does the placement of the piston in relation to the stones beneath the piston and the location and timing of stone breakage. Resistance to load would increase to a point of stone failure and plummet to a lower resistance until the next stone was encountered. This is not surprising due to the open nature of the matrix and the ability of shattering stones to quickly nest into surrounding voids. For this reason, results should focus on an acceptable range of CBR values in relation to density in this type of mix rather than a single measurement.

The materials used in this study would be considered acceptable for use as a subbase or as a base under light traffic pavement structures. These same materials have the potential to allow for vigorous root growth. Normally, materials classified in the classes such as the tested limestone and gravel blends in would be expected to possess a low frost heave potential. In the blends developed in this study, frost heave potential would likely be a function of the amount of hydrogel in the blend since it normally absorbs up to 300 times its own weight in water. However, it would be reasonable to believe that the material would be less frost sensitive than current materials in use if pore space existed

TABLE 5

Observed maximum densities and associated moisture contents of limestone blends resulting from standard and increased compaction efforts

| Stone to soil ratio | From 592.7 kJ/m3 effort (kg/m3) ± 7.5 kg/m$^3$ | | | From 1609 kJ/m3 effort (kg/m3) ± 7.5 kg/'m$^3$ | | |
|---|---|---|---|---|---|---|
| | Observed peak dry density | Observed optimum moisture content ± 1% | Porosity at peak density | Observed peak dry density | Observed optimum moisture content | Porosity at peak density |
| 4.057:1 | 1990 | 12.2 | 26% | 2030 | 12.1–13.0 | 24% |
| 4.997:1 | 1970 | 12.0 | 27% | 2050 | 9.0–12.0 | 24% |
| 5.026:1 | 1960 | 11.8 | 26% | 2040 | 8.0–12.5 | 23% |
| 6.28A | 1920 | 11.0 | 29% | 2030 | 8.5–11.5 | 25% |
| 7.085:1 | 1910 | 11.8 | 29% | 2000 | 11.5–13.0 | 26% |

California Bearing Ratios were determined on test blends with limestone to soil ratios of 4.057:1 and 5.026:1 to see how they would bear loading and to judge their efficacy as potential pavement bases. CBR testing was conducted on soaked samples following the ASTM 1883 protocol. The soil mix density was seen to consistently increase as expected with the increased 1609 kJ/m$^3$ compactive effort and with one exception, with increased amounts of soil in the stone matrix. The exception involved limestone 4.057:1 where, at the 1609 kJ/m$^3$ effort, the density observed actually dropped over 2.5 times beyond the assigned margin of error of 7.5 kg/m$^3$. This was taken to indicate that a critical stone to soil ratio had been crossed, and the soil portion of the blend had possibly impacted the formation of the stone matrix.

A minimum CBR value of 40 was considered satisfactory, and all tested blends showed an adequate CBR rating. One sample tested had a test density in the range of those of the study discussed in Example 1. That sample still would have been an acceptable base under saturated conditions (the worst case scenario) provided that the pavement was thick enough to withstand the projected maximum load of the sidewalk.

in large enough voids to allow for the expansion of ice lenses without disturbing the matrix. The rate of hydrogel used in the system now becomes an influential factor, and testing must be done to further define this rate. However, at the rate of 38 grams of hydrogel per 100 kg of stone, fully hydrated gel would occupy only 1% or less of the matrix pores.

There was little difference in moisture release behavior across the entire range of densities once any compactive effort was applied. This demonstrated the negative impact of light compaction on the moisture release behavior and associated pore size distribution on this particular disturbed soil. The moisture release characteristics of the straight soil did not produce the expected relationship with the root impedance in the oak study. In this case root impedance could have had more to do with the strength of the soil and its resistance to displacement by the oak roots than with soil moisture or pore size. This also reaffirms a growing belief that more attention should be given to soil protection on construction sites.

The examples provided herein show that it is possible to produce a pavement base which meets load bearing requirements for structural integrity while allowing tree root penetration. An engineer can use the criterion disclosed above for determining acceptable soil and stone types and the critical ratio window for the stone/soil mix. It is expected that engineers would specify a particular stone, soil and hydrogel mix and instructions for compaction. The mix would be created offsite and positioned and compacted by the contractor. Engineers may test the installation for proper compaction by standard techniques. Suppliers of fill and stone could have their products tested and provide pre-mixed material for on-site mixing.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of producing a stone and soil subbase system for pavement that supports growth of tree roots comprising the steps of:
   a) selecting a suitable stone to be used in said subbase system;
   b) selecting a type of soil to be used in said subbase system;
   c) determining at least one dry weight stone to soil ratio for said selected suitable stone and soil such that said subbase system allows growth of tree roots and has a load beating capacity to have a California Bearing Ratio of at least 40 when compacted to peak density;
   d) mixing said selected suitable stone and soil at said determined ratio with a hydrogel at a concentration of between 25 and 40 grams of hydrogel per 100 kilograms of stone to form a subbase mixture; and
   e) installing said subbase by placing said subbase mixture in a desired position for said subbase and compacting said mixture to peak density.

2. The method of claim 1 wherein said dry weight stone to soil ratio is between 3:1 to 8:1.

3. The method of claim 1 wherein said stone is selected from stone meeting size specification #4 according to ASTM C 33-93-Standard Specification for Concrete Aggregates.

4. A stone and soil subbase produced by the method of claim 1.

5. A stone and soil subbase that provides pavement stability and allows root growth comprising a compacted stone, soil and hydrogel mix such that said subbase system allows growth of tree roots and has a load bearing capacity to have a California Bearing Ratio of at least 40 wherein said hydrogel is added at a concetration of between 25 and 40 grams of hydrogel per 100 kilograms of stone.

6. The subbase of claim 5 wherein said stone and soil are mixed at a dry weight stone to soil ratio between 3:1 to 8:1.

7. The subbase of claim 5 wherein said stone is selected from stone meeting size specification #4 according to ASTM C 33-93-Standard Specification for Concrete Aggregates.

* * * * *

UNITED STATES PATENT AND TRADEMARK OFFICE
CERTIFICATE OF CORRECTION

PATENT NO. : 5,849,069
DATED : December 15, 1998
INVENTOR(S) : Jason Grabosky and Nina Bassuk It is certified that error appears in the above-identified patent and that said Letters Patent is hereby corrected as shown below:

On the title page, Inventors, change the name " Basset" to --Bassuk--.

Signed and Sealed this

Fourth Day of May, 1999

Attest:

Attesting Officer

Q. TODD DICKINSON

Acting Commissioner of Patents and Trademarks